Patented Apr. 1, 1952

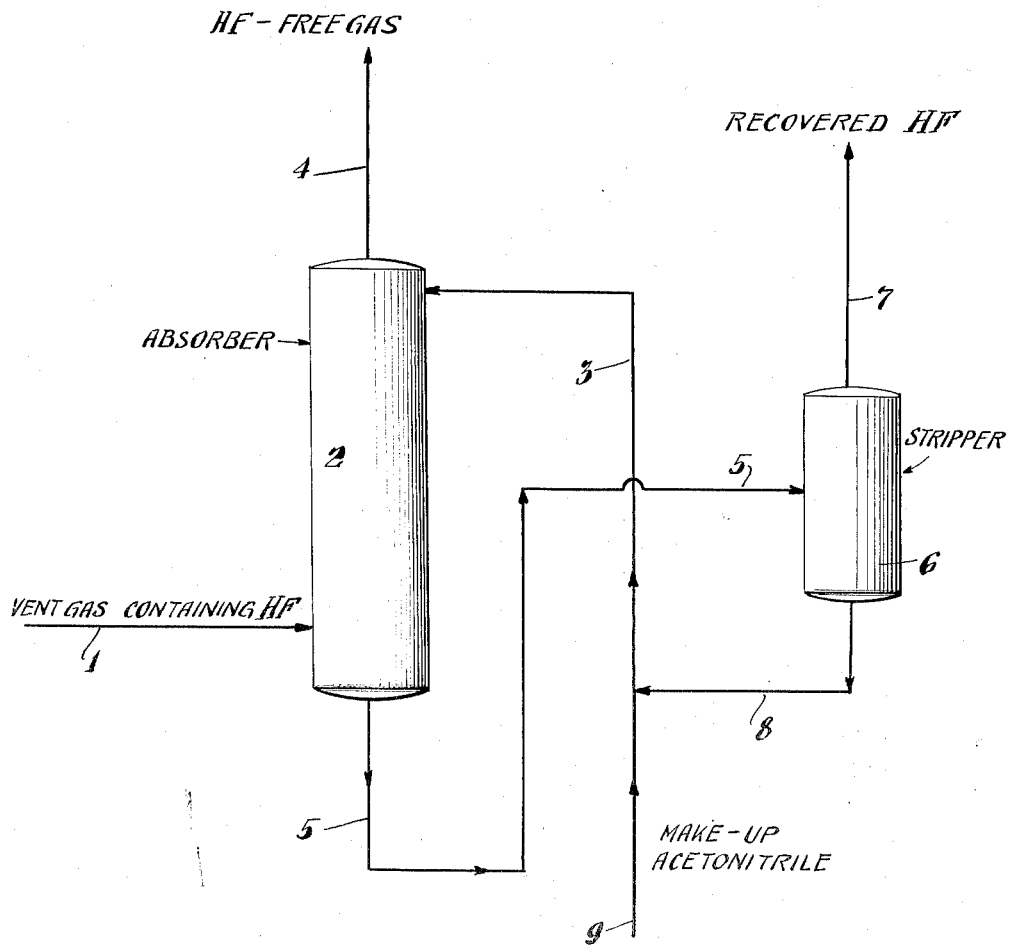

2,591,096

UNITED STATES PATENT OFFICE 2,591,096

HYDROGEN FLUORIDE RECOVERY

Joe E. Penick, Woodbury, N. J., assignor to Socony-Vacuum Oil Company, Incorporated, a corporation of New York Application May 8, 1950, Serial No. 160,647

7 Claims. (Cl. 183—115)

This invention has to do with a method and means for recovering hydrogen fluoride from hydrocarbon mixtures containing the same. The invention is particularly well adapted to the recovery and purification of hydrogen fluoride in processes of hydrocarbon reactions where hydrogen fluoride is employed as a catalyst.

Hydrogen fluoride has been found to be a highly useful catalytic agent for a number of hydrocarbon reactions since it is a powerful condensing agent with little or no tendency to unite chemically with hydrocarbons, particularly those of a saturated nature. Among the condensation reactions to which hydrogen fluoride is suited, paraffin alkylation by the catalytic condensation of olefins and isoparaffins is outstanding commercially. The invention, therefore, is discussed with particular reference to paraffin alkylation although there is no intention to limit the invention thereto.

In present commercial hydrogen fluoride alkylation, as in many other processes catalyzed by this agent, the system will contain organic compounds having boiling points of the same order as that of the catalyst. To a large extent, these organic compounds are reactants in the process and may be recycled with the catalyst to the reaction zone. Certain of the hydrocarbons are non-reactive in the process and tend to build up in the system unless some means is provided for their removal.

Certain elements in the system are normally vented to release undesirable compounds and upon shutdown of the system as a whole or of a single element, such as a pump for repair while transferring operations to stand-by equipment, the shutdown elements must be purged of hydrogen fluoride in order that they can be examined or repaired.

As a result of these several factors, a hydrogen fluoride alkylation plant normally has a fairly large amount of gaseous mixtures containing hydrocarbons and hydrogen fluoride requiring some means of disposal. For example, light gases such as hydrogen, methane, ethane and propane, present in alkylation feed stocks, tend to build up within the system and must be vented from time to time. Obviously, discharge to the air of gases containing such a highly poisonous agent as hydrogen fluoride is impossible. The gases can be washed with caustic, whereby hydrogen fluoride is neutralized, but the wash water cannot be discharged to normal sewage disposal means because the inorganic fluorides are poisonous. The usual disposal is to discharge liquids containing fluorides into a lime pit which can thereafter be covered over. In this connection, it is not practical from an economic standpoint to regenerate the hydrogen fluoride from the reaction products formed from caustic so that hydrogen fluoride removed by caustic scrubbing is lost.

Among the several methods previously proposed for recovering hydrogen fluoride is that described in United States Patent to Linn No. 2,342,677, granted February 29, 1944, wherein water is used as the separating means. A gaseous stream containing hydrogen fluoride is scrubbed with water, whereupon an aqueous hydrogen fluoride solution is formed, and the solution is then separated from hydrocarbons present. However, in most of its catalytic and/or solvent applications, hydrogen fluoride is required to be anhydrous. Thus, recovery of anhydrous hydrogen fluoride from dilute aqueous solutions gives rise to another separation problem; separation by a simple distillation operation is impossible—a constant boiling HF—$H_2O$ azeotrope containing about forty percent hydrogen fluoride is formed.

Another procedure proposed to date involves absorption of hydrogen fluoride from gaseous streams by contacting the latter with heavy olefinic oils, such as tar by-products from hydrogen fluoride alkylation, United States Patent to Matuszak No. 2,371,341, granted March 13, 1945. Unfortunately, these absorption media are quite unstable in the presence of hydrogen fluoride and are difficult to handle in ordinary pipes, heat exchangers, etc. Application of heat to drive off and recover the absorbed hydrogen fluoride often results in deposition of solid polymers and coke on the heating surface.

Organic solvents which will selectively absorb hydrogen fluoride from streams of inert vapors generally react irreversibly with the hydrogen fluoride to varying degrees. Thus, the reactions are not completely reversible so that at least portions of both the hydrogen fluoride and the absorbing medium are not readily recoverable.

It has now been found that hydrogen fluoride is selectively removed from anhydrous mixtures of the same and hydrocarbons by contacting the mixtures with an acetonitrile-hydrogen fluoride complex. Following contact of a hydrogen fluoride containing mixture with the acetonitrile-hydrogen fluoride complex, the complex is stripped of absorbed hydrogen fluoride and relatively pure hydrogen fluoride is recovered therefrom.

Hydrogen fluoride and acetonitrile form a complex of approximately one mol of hydrogen fluoride per mol of acetonitrile. The complex is miscible in all proportions with hydrogen fluoride, whereas the mutual solubility of the complex and saturated hydrocarbons is low. Thus, it has been found that the complex selectively absorbs hydrogen fluoride from either gaseous or liquid saturated hydrocarbons.

The composition of the acetonitrile-hydrogen fluoride complex is shown by the following illustration. When three mols of hydrogen fluoride (60 lbs.) are mixed with one mol of acetonitrile (41 lbs.) and the resulting mixture is distilled at atmospheric pressure, there is obtained about two mols of anhydrous hydrogen fluoride (40 lbs.) overhead at 69° F. and the remainder of the mixture (61 lbs.) distills at a nearly constant temperature of 196° F. Correspondingly, when three mols of acetonitrile (123 lbs.) are mixed with one mol of hydrogen fluoride (20 lbs.), an atmospheric pressure fractional distillation gives about two mols of acetonitrile (82 lbs.) distilling over at 180° F., and the remainder of the mixture (61 lbs.) distills over at a nearly constant temperature of 196° F.

A suitable system for carrying out a continuous process for recovering hydrogen fluoride is shown in the accompanying diagram, which is provided by way of illustration and not by way of limitation. A vent gas containing about 20 weight per cent of hydrogen fluoride, for example a gas containing propane and ethane and obtained in a hydrogen fluoride alkylation process, is led in through line 1 to absorber 2, wherein it comes into contact with the acetonitrile-hydrogen fluoride complex described above. The acetonitrile-hydrogen fluoride complex is introduced to absorber 2 through line 3. In general, operating temperatures of about 80–100° F. are satisfactory. Hydrogen fluoride-free gas is taken overhead from the absorber 2 through line 4, and hydrogen fluoride absorbed by the acetonitrile-hydrogen fluoride complex is taken from the absorber through line 5 to stripper 6. Hydrogen fluoride is recovered from the stripper through overhead line 7, and the acetonitrile-hydrogen fluoride complex is removed from the stripper 6 through line 8 and is recycled through line 3. The acetonitrile-hydrogen fluoride complex has a nearly constant boiling temperature of 196° F. (91° C.) at atmospheric pressure, in contrast to the boiling point of hydrogen fluoride, namely, 69° F. (20° C.). Make-up acetonitrile is added to the system via line 9.

The conditions of temperature and pressure prevailing in absorber 2 and stripper 6 will be governed primarily by the pressures found convenient for coordination of the recovery system with the alkylation plant in general. The absorber or scrubber is generally operated at considerably lower temperatures than the stripper. The recovery system can be operated at any desired pressure, for example up to 100 pounds per square inch. However, the system works well at or near atmospheric pressure. For practical purposes, the stripper is preferably operated at pressures sufficiently high to permit condensation of the overhead by use of plant water. In a typical operation, the absorber or scrubber is operated at 80–100° F. and the stripper at 200–300° F.

With respect to equipment in which the process is carried out, it is recommended that copper equipment be avoided. It has been observed that the acetonitrile-hydrogen fluoride complex reacts with copper to form an insoluble material.

As indicated above, the mixtures contemplated herein are substantially anhydrous, in order that acetonitrile be free from hydrolysis in the absorbing and distillation operations. Although the invention has been described in terms of separating hydrogen fluoride from mixtures containing the same and hydrocarbons, the invention is also advantageous for effecting separation of hydrogen fluoride from other materials inert to hydrogen fluoride and nitriles such as nitrogen, hydrogen, argon, etc.

It is to be understood, that while acetonitrile has been described as one component of the treating agent, it is only one specific example and that other nitriles can also be used to advantage. Typical nitriles are propionitrile, butyronitrile, valeronitrile, benzonitrile and tolunitriles. The nitriles are generally liquids, having melting points below temperatures suitable for absorbing hydrogen fluoride.

It is also to be understood that hydrogen halides other than hydrogen fluoride can be separated from mixtures containing the same in the present method. Thus, HCl, HBr and HI can be separated by contacting a mixture containing one or more of the halides, with a hydrogen halide complex containing a nitrile such as acetonitrile.

I claim:

1. A process for the recovery of hydrogen fluoride from an anhydrous mixture of hydrogen fluoride and a fluid substantially chemically inert to hydrogen fluoride and acetonitrile, which comprises: contacting said mixture with a hydrogen fluoride-acetonitrile complex, whereby hydrogen fluoride present in said mixture is selectively absorbed by the complex; and removing absorbed hydrogen fluoride from said complex.

2. A process for the recovery of hydrogen fluoride from an anhydrous mixture of hydrogen fluoride and a fluid substantially chemically inert to hydrogen fluoride and acetonitrile, which comprises: contacting said mixture with a hydrogen fluoride-acetonitrile complex, whereby hydrogen fluoride present in said mixture is selectively absorbed by the complex; and stripping absorbed hydrogen fluoride from said complex.

3. A process for the recovery of anhydrous hydrogen fluoride from an anhydrous mixture of hydrogen fluoride and a low-boiling aliphatic hydrocarbon, which comprises: scrubbing said mixture with a hydrogen fluoride-acetonitrile complex comprising about one molar proportion of hydrogen fluoride and one molar proportion of acetonitrile, whereby hydrogen fluoride present in the mixture is selectively absorbed by the complex; and stripping absorbed hydrogen fluoride from the complex.

4. A process for the recovery of hydrogen fluoride from an anhydrous mixture of hydrogen fluoride and a fluid substantially chemically inert to hydrogen fluoride and a liquid nitrile, which comprises: contacting said mixture with a complex comprising hydrogen fluoride and a liquid nitrile, whereby hydrogen fluoride present in said mixture is selectively absorbed by the complex; and removing absorbed hydrogen fluoride from said complex.

5. A process for the recovery of a hydrogen halide from an anhydrous mixture of a hydrogen halide and a fluid substantially chemically inert to said hydrogen halide and a liquid nitrile, which comprises: contacting said mixture with a complex comprising a hydrogen halide and a liquid nitrile, whereby hydrogen halide present in the mixture is selectively absorbed by the complex; and removing absorbed hydrogen halide from the complex.

6. A process for removing hydrogen fluoride from an anhydrous mixture of low boiling hydrocarbons and hydrogen fluoride, which comprises: contacting the mixture with a complex comprising hydrogen fluoride and acetonitrile, whereby hydrogen fluoride present in the mixture is selectively absorbed by the complex.

7. A process for removing hydrogen fluoride from an anhydrous mixture of low boiling hydrocarbons and hydrogen fluoride, which comprises: contacting the mixture with a complex comprising hydrogen fluoride and a liquid nitrile, whereby hydrogen fluoride present in the mixture is selectively absorbed by the complex.

JOE E. PENICK.

REFERENCES CITED

The following references are of record in the file of this patent:

UNITED STATES PATENTS

| Number | Name | Date |
| --- | --- | --- |
| 2,379,041 | Schulze et al. | June 26, 1943 |
| 2,392,048 | Kassel | Jan. 1, 1946 |
| 2,400,874 | Burk | May 28, 1946 |
| 2,462,739 | Gresham | Feb. 22, 1949 |
| 2,494,867 | Frey | Jan. 17, 1950 |

FOREIGN PATENTS

| Number | Country | Date |
| --- | --- | --- |
| 400,054 | Great Britain | Oct. 19, 1933 |

OTHER REFERENCES

"Organic Chemistry," by Paul Karrer, 2nd English ed., 1946, page 178; Elsevier Pub. Co., Inc., New York.

"An Outline of Organic Chemistry," revised 1937 ed., pages 147 and 148; Barnes and Noble, Inc., New York.